(12) United States Patent
Zhan

(10) Patent No.: US 9,541,315 B2
(45) Date of Patent: Jan. 10, 2017

(54) ELECTRONIC EXPANDING VALVE

(75) Inventor: Caiyi Zhan, Zhejiang Province (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 90 days.

(21) Appl. No.: 14/408,536

(22) PCT Filed: Aug. 10, 2012

(86) PCT No.: PCT/CN2012/079939
§ 371 (c)(1),
(2), (4) Date: Dec. 16, 2014

(87) PCT Pub. No.: WO2014/023014
PCT Pub. Date: Feb. 13, 2014

(65) Prior Publication Data
US 2015/0184768 A1    Jul. 2, 2015

(51) Int. Cl.
F25B 41/06 (2006.01)
F16K 1/52 (2006.01)
F16K 31/04 (2006.01)

(52) U.S. Cl.
CPC ............ *F25B 41/062* (2013.01); *F16K 1/523* (2013.01); *F16K 31/041* (2013.01); *F25B 2341/0653* (2013.01); *Y02B 30/72* (2013.01)

(58) Field of Classification Search
CPC .... F16K 31/041; F16K 31/055; F16K 31/045; F16K 31/046; F16K 1/50; F16K 1/523; F16K 5/0242; F16K 5/0442; F16K 31/0655; F25B 41/062
(Continued)

(56) References Cited

U.S. PATENT DOCUMENTS 2,345,306 A    3/1944   Van Der Werff
5,275,200 A *  1/1994   Yamamoto ............ F16K 5/0647
                                            137/315.18
(Continued)

FOREIGN PATENT DOCUMENTS

CN    1132328 A    10/1996
CN    1297518 A     5/2001
(Continued)

OTHER PUBLICATIONS

International Search Report dated May 23, 2013 from corresponding International Application No. PCT/CN2012/079939.
(Continued)

Primary Examiner — Matthew W Jellett
(74) Attorney, Agent, or Firm — Wolf, Greenfield & Sacks, P.C.

(57) ABSTRACT

An electronic expansion valve is provided, a stop component thereof includes a spindle which is fixed with respect to the valve seat, a spring guide rail sleeved on the spindle, and a sliding ring configured to cooperate with the spring guide rail; one end of the sliding ring extends to form a stop rod, and a top of the magnet is provided with a stop hole, the stop rod passes through the stop hole, and when the sliding ring is at an upper limit position and a lower limit position, the stop rod remains in the stop hole. The structural design of the electronic expansion valve may reduce a number of components, simplify the assembly process of a stop rod, and improve the operational reliability of the stop rod, and reduce a radial dimension of a magnet, thereby saving the material cost and realizing the minimization of the product.

13 Claims, 9 Drawing Sheets

(58) Field of Classification Search
USPC .............................. 251/129.11, 129.12, 288
See application file for complete search history.

(56) References Cited

U.S. PATENT DOCUMENTS

| | | | | |
|---|---|---|---|---|
| 6,220,571 | B1* | 4/2001 | Kim | F16K 31/047 251/129.11 |
| 7,124,999 | B1* | 10/2006 | Lai | E03B 9/02 137/382.5 |
| 8,157,184 | B2* | 4/2012 | Hayashi | F25B 41/062 236/92 B |
| 8,556,229 | B2* | 10/2013 | Lv | F16K 31/047 251/129.11 |
| 8,651,456 | B2* | 2/2014 | Zhan | F25B 41/062 251/276 |
| 2006/0273272 | A1* | 12/2006 | Uchida | F16K 39/022 251/129.11 |
| 2009/0293520 | A1* | 12/2009 | Hayashi | F25B 41/062 62/222 |
| 2010/0263397 | A1 | 10/2010 | Suganuma | |
| 2014/0291562 | A1* | 10/2014 | Ooe | F16K 31/04 251/129.11 |
| 2015/0121951 | A1* | 5/2015 | Zhan | F25B 41/062 62/528 |

FOREIGN PATENT DOCUMENTS

| | | |
|---|---|---|
| CN | 1762746 A | 4/2006 |
| CN | 2931997 Y | 8/2007 |
| CN | 200968423 Y | 10/2007 |
| CN | 101135387 A | 3/2008 |
| CN | 201327255 Y | 10/2009 |
| CN | 101678822 A | 3/2010 |
| CN | 102032380 A | 4/2011 |
| CN | 102042416 A | 5/2011 |
| CN | 102252119 A | 11/2011 |
| CN | 202182593 U | 4/2012 |
| CN | 102454819 A | 5/2012 |
| DE | 102006060099 A1 | 6/2008 |
| JP | 2000227165 A | 8/2000 |
| JP | 2001304445 A | 3/2003 |
| JP | 2003065454 B2 | 3/2003 |
| JP | 4285155 B2 | 4/2009 |
| JP | 2009287913 A | 12/2009 |
| JP | 2010249246 A | 11/2010 |
| JP | 2012047213 A | 3/2012 |
| KR | 100552942 B1 | 2/2006 |

OTHER PUBLICATIONS

International Search Report dated Mar. 28, 2013 from potentially related International Application No. PCT/CN2012/079936.
International Search Report dated Feb. 28, 2013 from potentially related International Application No. PCT/CN2012/079932.
International Search Report dated Feb. 28, 2013 from potentially related International Application No. PCT/CN2012/079933.
International Search Report dated Feb. 28, 2013 from potentially related International Application No. PCT/CN2012/079927.
International Search Report dated Feb. 28, 2013 from potentially related International Application No. PCT/CN2012/079930.

* cited by examiner

ELECTRONIC EXPANDING VALVE

CROSS-REFERENCE TO RELATED APPLICATION

The present application is the national phase of International Application No. PCT/CN2012/079939, titled "ELECTRONIC EXPANDING VALVE", filed on Aug. 10, 2012, the entire disclosure of which is incorporated herein by reference.

TECHNICAL FIELD

The present application relates to the technical field of fluid control components, and particularly to an electronic expansion valve.

BACKGROUND

In the field of refrigerating and heating technology, an electronic expansion valve is a component used to control a flow rate of refrigerant in a refrigerating and heating device, and the working process of the electronic expansion valve is generally illustrated as follows. With a coil device being energized or de-energized, a vale needle regulates an opening of a valve port, thereby regulating the flow rate of the refrigerant.

In the conventional technology, an electronic expansion valve is disclosed in a Chinese Patent Application Publication No. "CN102454819A". Reference is made to FIG. 1, which is a schematic view showing the structure of an electronic expansion valve in the conventional technology.

As shown in FIG. 1, the electronic expansion valve includes a valve seat 1' and a housing 2', and the housing 2' is fixedly supported on the valve seat 1', therefore, the relative position between the housing 2' and the valve seat 1' is fixed. A rotatable magnet 3' is provided inside the housing 2', the magnet 3' is fixedly connected to a screw rod 4', and the screw rod 4' cooperates with a nut 5' by screw threads. The nut 5' has a lower end fixed to the valve seat 1', therefore, the relative position between the nut 5' and the valve seat 1' is fixed. The electronic expansion valve further includes a stop component, the stop component includes a spindle 6'1 which is fixed with respect to the valve seat 1', a spring guide rail 6'2 sleeved on the spindle 6'1, and a sliding ring 6'3 configured to cooperate with the spring guide rail 6'2. In such structure, an upper portion of the nut 5' forms the spindle 6'1, and the spring guide rail 6'2 is sleeved on an outer wall of the upper portion of the nut 5'.

As show in FIG. 1, in the above structure, a top portion of the magnet 3' is provided with a connecting seat 3'1, the connecting seat 3'1 is connected to a stop rod 6'4 extending downwards, and the stop rod 6'4 cooperates with an extending portion 6'3a of the sliding ring 6'3. As the magnet 3' rotates, the stop rod 6'4 cooperates with the extending portion 6'3a to drive the sliding ring 6'3 to rotate along the spring guide rail 6'2, and the scope of rotation of the sliding ring 6'3 is limited between an upper limit position and a lower limit position of the spring guide rail 6'2, thereby limiting a number of turns of rotation of the magnet 3'.

However, the electronic expansion valve of the above structure has the following defects:

Firstly, the stop rod 6'4 is connected to an inner wall of the connecting seat 3'1, and is assembled inside the magnet 3', thus the assembly process is difficult, and the assembly cost is high. Furthermore, the reliability of connection of the stop rod 6'4 is low, and after working for a period of time, the stop rod 6'4 is apt to fall out.

Secondly, the extending portion 6'3a of the sliding ring 6'3 is required to extend in a radial direction by an enough length so as to cooperate with the stop rod 6'4, and meanwhile, it is further required to avoid an interference between the extending portion 6'3a and the inner wall of the magnet 3', thus the magnet 3' is required to have a large radial dimension, which not only increases the material cost, but also is adverse to the minimization of the product.

SUMMARY

One technical problem to be solved by the present application is to provide an electronic expansion valve, and the structural design of the electronic expansion valve may, on one hand, reduce a number of components, simplify the assembly process of a stop rod, and improve the operational reliability of the stop rod, and on the other hand, reduce a radial dimension of a magnet, thereby saving the material cost and realizing the minimization of the product.

To solve the above technical problems, an electronic expansion valve is provided according to the present application, which includes a valve seat and a housing; a rotatable magnet is arranged inside the housing, the magnet is fixedly connected to a screw rod, and the screw rod cooperates with a nut by screw threads, and the nut is fixed with respect to the valve seat; the electronic expansion valve further includes a stop component, the stop component includes a spindle which is fixed with respect to the valve seat, a spring guide rail sleeved on the spindle, and a sliding ring configured to cooperate with the spring guide rail; wherein one end of the sliding ring extends to form a stop rod, and the magnet is provided with a stop hole, the stop rod passes through the stop hole, and in a case that the sliding ring is at an upper limit position and a lower limit position, the stop rod remains in the stop hole.

Preferably, the magnet includes a connecting seat, the connecting seat is fixedly connected to the screw rod, and the stop hole is provided in the connecting seat.

Preferably, the stop hole is provided at an eccentric position of the connecting seat.

Preferably, the spring guide rail is sleeved on an outer circumference of an upper portion of the nut, the upper portion of the nut forms the spindle, and an upper end of the sliding ring extends upwards to form the stop rod.

Preferably, the spindle is fixed to an inner wall of a top end of the housing, and a lower end of the sliding ring extends downwards to form the stop rod.

Preferably, the stop hole is an arc segment hole extending in a direction of a circular arc.

Preferably, a number of the arc segment holes is two or more, and the arc segment holes are arranged symmetrically with respect to an axes.

Preferably, the stop hole is a circular hole.

Preferably, a number of the circular holes is two or more, and the circular holes are arranged symmetrically with respect to an axes.

Based on the conventional technology, in the electronic expansion valve according to the present application, one end of the sliding ring extends to form the stop rod, and the magnet is provided with a stop hole, the stop rod passes through the stop hole, and when the sliding ring is at the upper limit position and the lower limit position, the stop rod remains in the stop hole. In such structure, as the magnet rotates, due to the cooperation between the stop hole and the stop rod, the magnet drives the stop rod to rotate and in turn drives the sliding ring to rotate along the spring guide rail, thus a scope of the rotation of the sliding ring is limited between the upper limit position and the lower limit position of the spring guide rail, thereby limiting a number of turns of rotation of the magnet.

In the above structure, the stop rod and the sliding ring are formed integrally, and one end of the sliding ring extends to form the stop rod. Compared to the structure of the stop rod in the conventional technology, the stop rod in the present application is not required to be assembled, and is not required to be connected to an inner side of a top portion of the magnet, thereby reducing the number of components and simplifying the assembly process of the stop rod. Furthermore, since the stop rod is not required to be connected to the inner wall of the top portion of the magnet, the problem of unreliable connection of the stop rod is also avoided, thus the stop rod will not fall out even after working for a long period of time, thereby improving the operational reliability.

Furthermore, compared to the structure in the conventional technology that the extending portion cooperates with the stop rod, in the present application, the extending portion of the sliding ring in the conventional technology is omitted, thus it is not required to consider the problem that the extending portion has to extend by a sufficient length, and thus the radial dimension of the magnet is reduced, thereby saving the material cost and realizing the minimization of the product.

In summary, the electronic expansion valve according to the present application may, on one hand, reduce a number of components, simplify the assembly process of the stop rod, and improve the operational reliability of the stop rod, and on the other hand, reduce a radial dimension of the magnet, thereby saving the material cost and realizing the minimization of the product.

Figure 1:
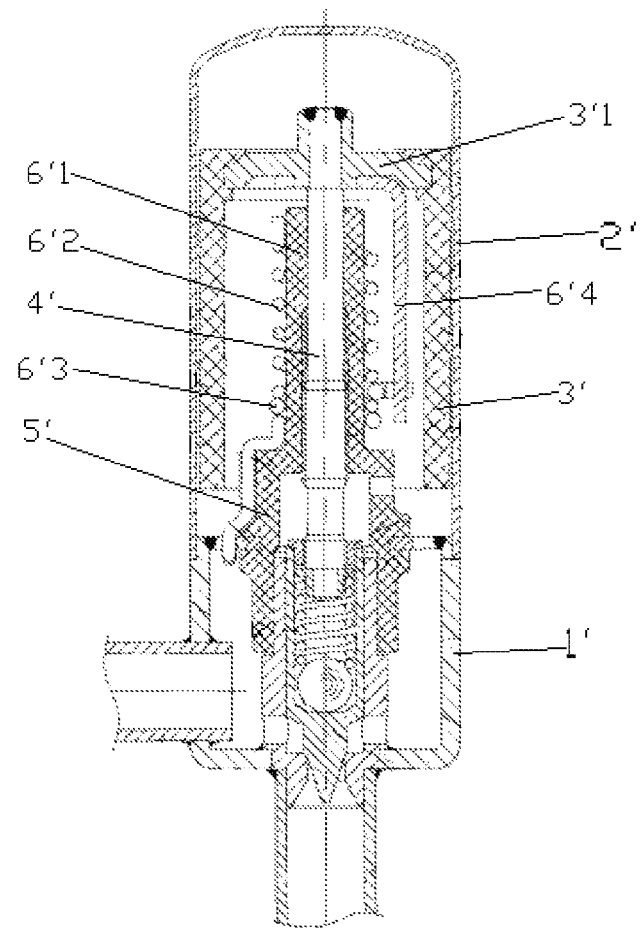
FIG. 1 is a schematic view showing the structure of an electronic expansion valve in the conventional technology.

Corresponding relationships between reference numerals and components in FIG. 1 are as follows:

| 1' | valve seat; | 2' | housing; |
|---|---|---|---|
| 3' | magnet, | 3'1 | connecting seat; |
| 4' | screw rod; | 5' | nut; |
| 6'1 | spindle, | 6'2 | spring guide rail, |
| 6'3 | sliding ring, | 6'3a | extending portion, and |
| 6'4 | stop rod. | | |

Corresponding relationships between reference numerals and components in FIGS. 2 to 10 are as follows:

| 1 | valve seat; | 2 | housing; |
|---|---|---|---|
| 3 | magnet, | 31 | connecting seat, |
| 31a | stop hole; | 4 | screw rod; |
| 5 | nut; | 61 | spindle, |
| 62 | spring guide rail, | 62a | upper stop portion, |
| 62b | lower stop portion, | 63 | sliding ring, and |
| 64 | stop rod. | | |

DETAILED DESCRIPTION

An object of the present application is to provide an electronic expansion valve, and the structural design of the electronic expansion valve may, on one hand, reduce a number of components, simplify the assembly process of a stop rod, and improve the operational reliability of the stop rod, and on the other hand, reduce a radial dimension of a magnet, thereby saving the material cost and realizing the minimization of the product.

For those skilled in the art to better understand technical solutions of the present application, the present application is described in detail in conjunction with drawings and embodiments hereinafter.

Figure 2:
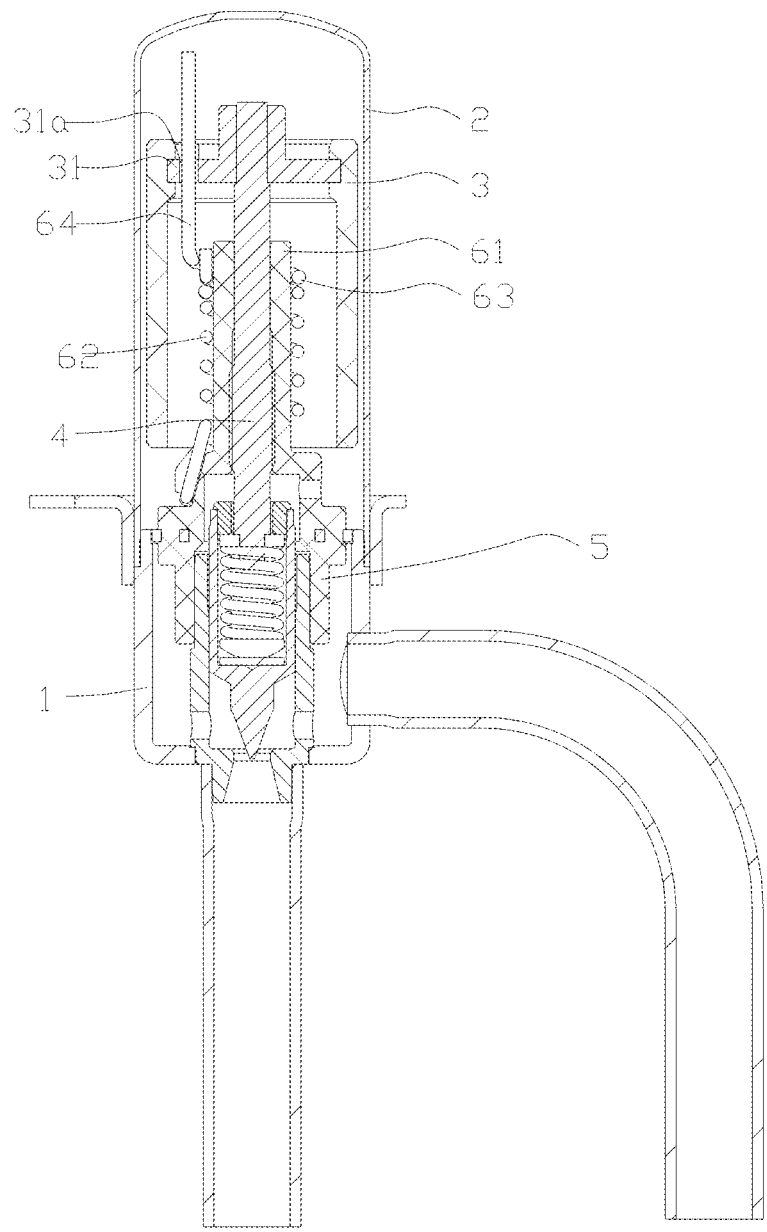
FIG. 2 is a schematic view showing the structure of an electronic expansion valve according to a first embodiment of the present application.
Figure 3:
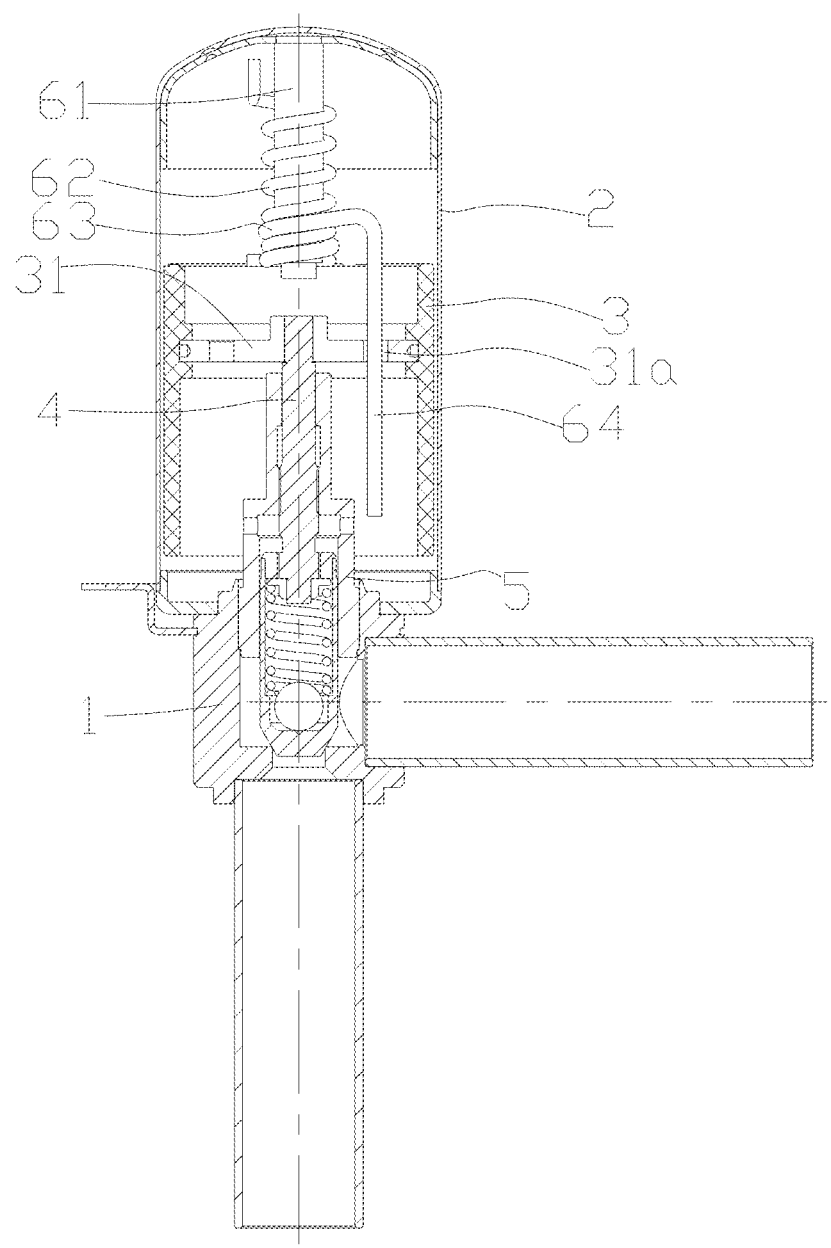
FIG. 3 is a schematic view showing the structure of an electronic expansion valve according to a second embodiment of the present application.

Reference is made to FIGS. 2 and 3. FIG. 2 is a schematic view showing the structure of an electronic expansion valve according to a first embodiment of the present application; and FIG. 3 is a schematic view showing the structure of an electronic expansion valve according to a second embodiment of the present application.

In the basic technical solution of the present application, as shown in FIGS. 2 and 3, the electronic expansion valve includes a valve seat 1 and a housing 2, the housing 2 is fixedly supported on the valve seat 1, and therefore, the relative position between the housing 2 and the valve seat 1 is fixed. A rotatable magnet 3 is arranged inside the housing 2, the magnet 3 is fixedly connected to a screw rod 4, and the screw rod 4 cooperates with a nut 5 by screw threads. The nut 5 has a lower end fixed to the valve seat 1, and therefore, the relative position between the nut 5 and the valve seat 1 is fixed. The electronic expansion valve further includes a stop component, and the stop component includes a spindle 61 which is fixed with respect to the valve seat 1, a spring guide rail 62 sleeved on the spindle 61, and a sliding ring 63 configured to cooperate with the spring guide rail 62.

Based on the above structure, as shown in FIGS. 2 and 3, one end of the sliding ring 63 extends to form a stop rod 64, the magnet 3 is provided with a stop hole 31a, and the stop rod 64 passes through the stop hole 31a. When the sliding ring 63 is at an upper limit position or a lower limit position, the stop rod 64 remains in the stop hole 31a. As shown in FIGS. 2 and 3, the magnet 3 is provided with a connecting seat 31, and the connecting seat 31 is provided with the stop hole 31a.

In the above structure, the stop rod 64 and the sliding ring 63 are formed integrally, and one end of the sliding ring 63 extends to form the stop rod 64. Compared to the structure of the stop rod 64 in the conventional technology, the stop rod 64 in the present application is not required to be assembled, and is not required to be connected to an inner side of a top portion of the magnet 3, thereby reducing the number of components and simplifying the assembly process of the stop rod 64. Furthermore, since the stop rod 64 is not required to be connected to the inner wall of the top portion of the magnet 3, the problem of unreliable connection of the stop rod 64 is also avoided, thus the stop rod 64 will not fall out even after working for a long period of time, thereby improving the operational reliability.

Furthermore, compared to the structure in the conventional technology that the extending portion cooperates with the stop rod 64, in the present application, the extending portion of the sliding ring 63 in the conventional technology is omitted, thus it is not required to consider the problem that the extending portion has to extend by a sufficient length, and thus the radial dimension of the magnet 3 is reduced, thereby saving the material cost and realizing the minimization of the product.

In summary, the electronic expansion valve according to the present application may, on one hand, reduce a number of components, simplify the assembly process of the stop rod 64, and improve the operational reliability of the stop rod 64, and on the other hand, reduce a radial dimension of the magnet 3, thereby saving the material cost and realizing the minimization of the product.

In the above technical solution, the stop rod 64 is of a straight rod structure, and may be further arranged to be parallel to an axis of the magnet 3. The stop hole 31a is arranged at an eccentric position of the top portion of the magnet 3. Such structural design may facilitate rising and lowering of the stop rod 64 in the stop hole 31a.

In the first embodiment of the present application, as shown in FIG. 2, the spring guide rail 62 is sleeved on an outer circumference of an upper portion of the nut 5, and the upper portion of the nut 5 forms the spindle 61, and an upper end of the sliding ring 63 extends upwards to form the stop rod 64.

Furthermore, as shown in FIG. 3, in the second embodiment of the present application, the spindle 61 is fixed to an inner wall of a top end of the housing 2, and a lower end of the sliding ring 63 extends downwards to form the stop rod 64.

Figure 4:
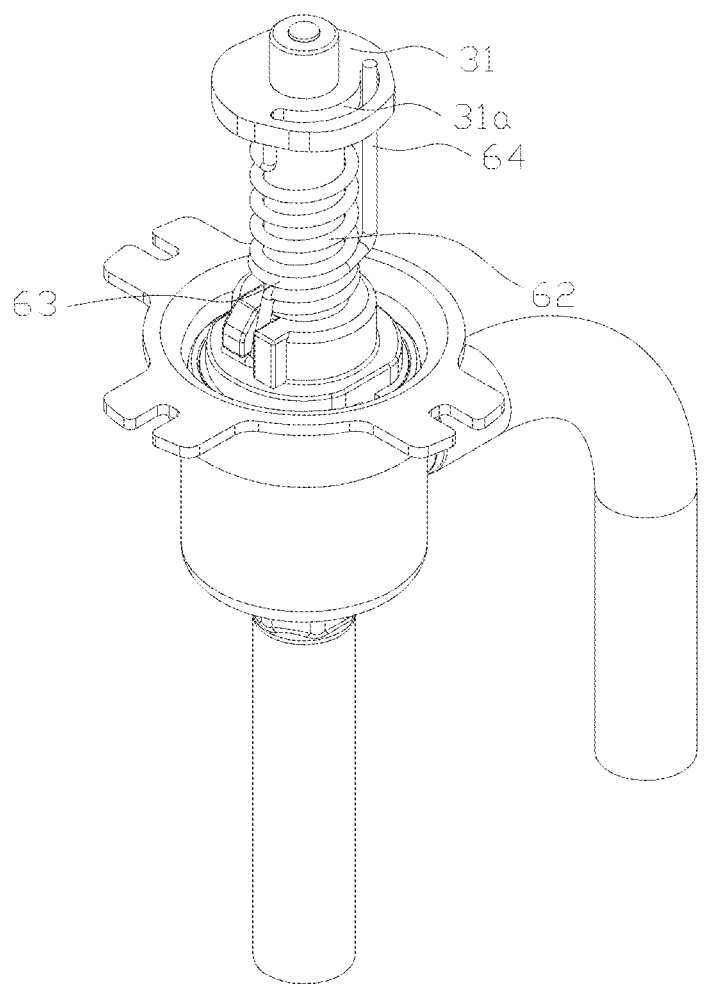
FIG. 4 is a structural schematic view showing a sliding ring of the electronic expansion valve in FIG. 2 at a lower limit position (a housing and a magnet are omitted)
Figure 5:
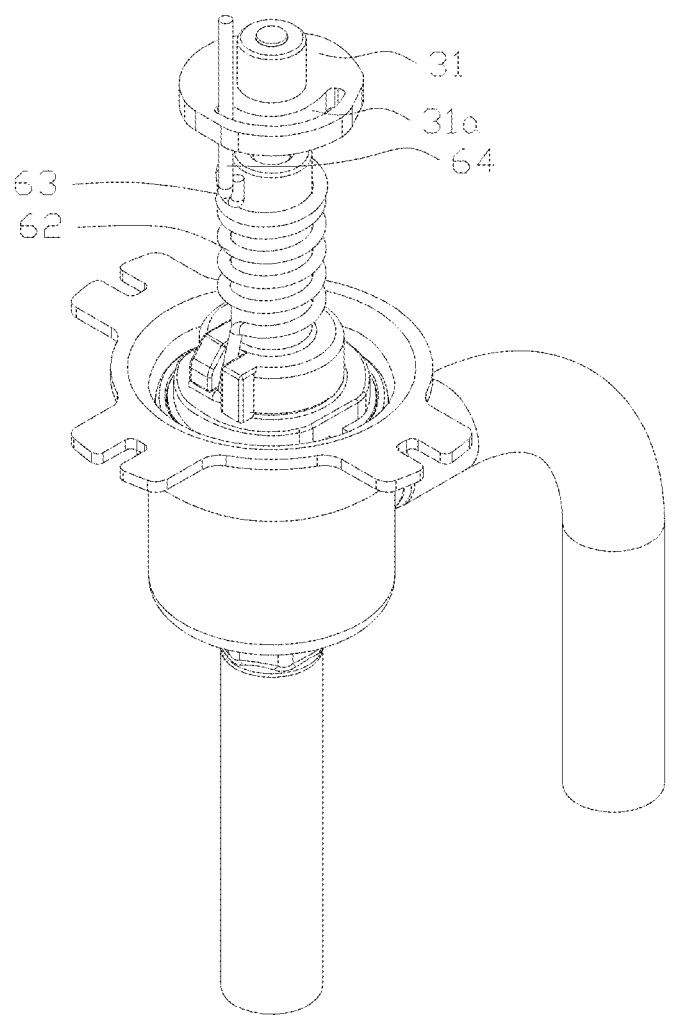
FIG. 5 is a structural schematic view showing the sliding ring of the electronic expansion valve in FIG. 2 at an upper limit position (the housing and the magnet are omitted)
Figure 6:
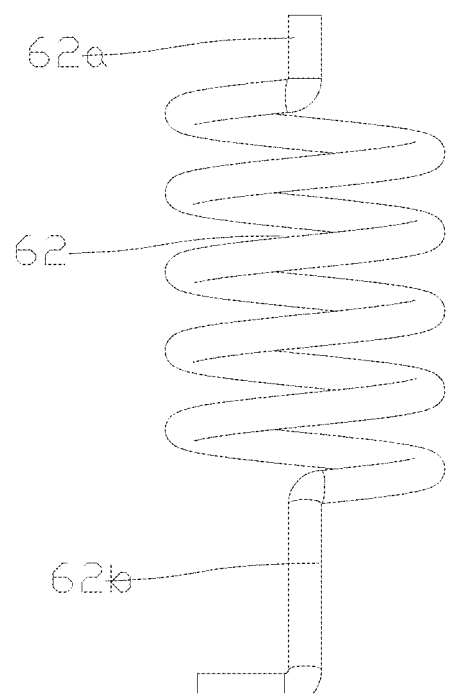
FIG. 6 is a schematic view showing the structure of a spring guide rail of the electronic expansion valve in FIG. 2.
Figure 7:
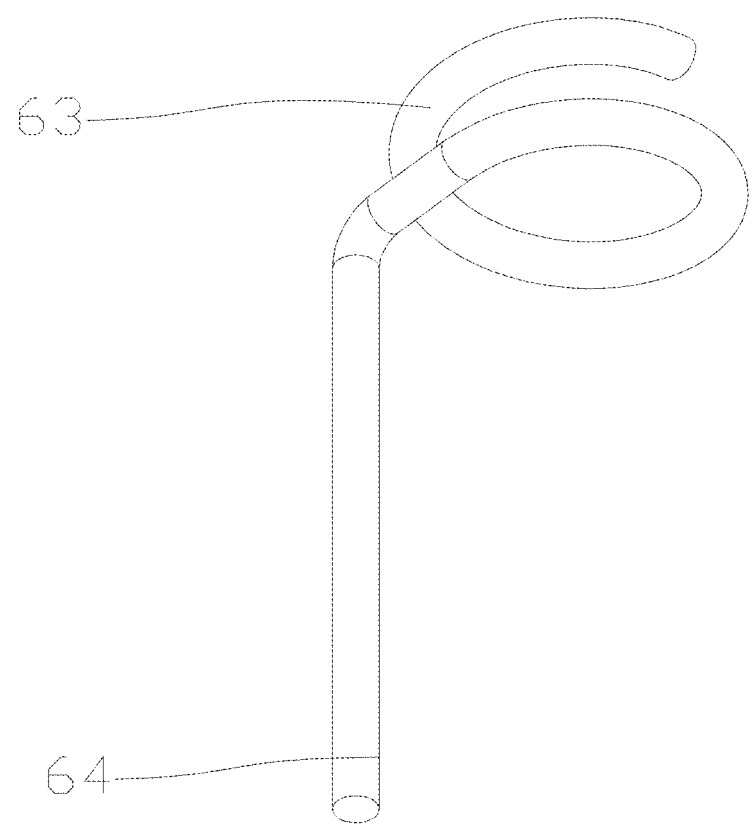
FIG. 7 is a schematic view showing the structure of the sliding ring of the electronic expansion valve in FIG. 2.

Further, reference is made to FIGS. 4 to 7. FIG. 4 is a structural schematic view showing the sliding ring of the electronic expansion valve in FIG. 2 at a lower limit position (the housing and the magnet are omitted); FIG. 5 is a structural schematic view showing the sliding ring of the electronic expansion valve in FIG. 2 at an upper limit position (the housing and the magnet are omitted); FIG. 6 is a schematic view showing the structure of the spring guide rail of the electronic expansion valve in FIG. 2; and FIG. 7 is a schematic view showing the structure of the sliding ring of the electronic expansion valve in FIG. 2.

As shown in FIG. 6, the spring guide rail 62 is provided with an upper stop portion 62a and a lower stop portion 62b. As shown in FIG. 7, one end of the sliding ring 63 extends linearly to form the stop rod 64. On this basis, as shown in FIG. 4, when moving downwards, the sliding ring 63 will be stuck when coming into contact with the lower stop portion 62b, and at this time, the sliding ring 63 reaches the lowermost position of the stroke. As shown in FIG. 5, when moving upwards, the sliding ring 63 will be stuck when coming into contact with the upper stop portion 62a, and at this time, the sliding ring 63 reaches the topmost position of the stroke. The sliding ring 63 moves between the upper stop portion 62a and the lower stop portion 62b, to limit a number of turns of rotation of the magnet 3, thereby adjusting the stroke of a valve needle.

Figure 8:
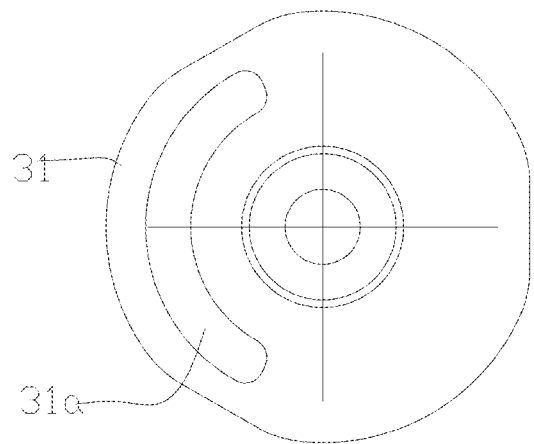
FIG. 8 is a schematic view showing the structure of a connecting seat of the magnet of the electronic expansion valve in FIGS. 2 and 3.
Figure 9:
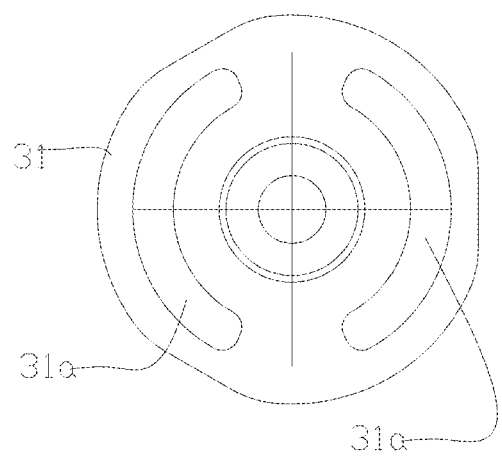
FIG. 9 is a schematic view showing the structure of a connecting seat of another structure.
Figure 10:
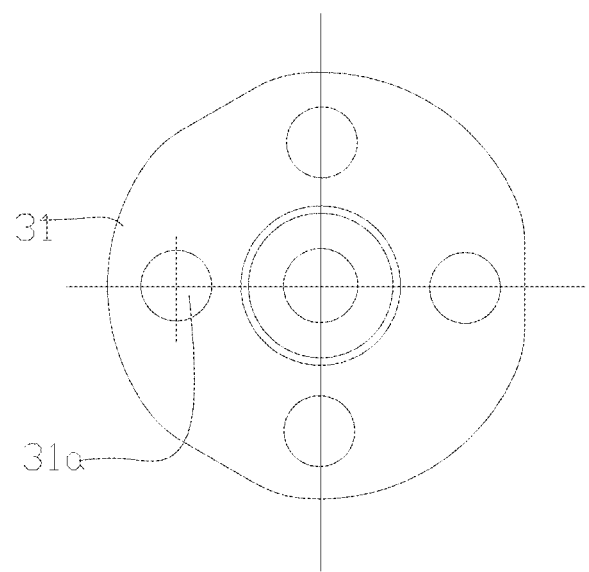
FIG. 10 is a schematic view showing the structure of a connecting seat of another structure.

Based on the above technical solution, a further improvement may be made. Reference is made to FIGS. 8 to 10. FIG. 8 is a schematic view showing the structure of the connecting seat of the magnet of the electronic expansion valve in FIGS. 2 and 3; FIG. 9 is a schematic view showing the structure of the connecting seat of another structure; and FIG. 10 is a schematic view showing the structure of the connecting seat of another structure.

As shown in FIG. 8, the stop hole 31a is an arc segment hole extending in a direction of the circular arc. Such design may reduce the number of turns of the spring guide rail 62. For example, when the arc segment hole extends over 120 degrees in a circular plane, the number of turns of the spring guide rail 62 may be reduced by one third turn. Under a precondition of ensuring the strength of the connecting seat and avoiding an interference between the arc segment hole and a pouring gate of the magnet 3, the larger the extending angle of the arc segment hole, the better, thus the number of turns of the spring guide rail 62 will be reduced more.

As shown in FIG. 9, a number of the arc segment holes may be two or more, and the arc segment holes may further be arranged symmetrically with respect to the axes of the connecting seat 31. In a case that the space is not limited, the extending angle of one arc segment hole may be reduced, and the arc segment hole may be arranged as a plurality of segments, which may facilitates the assembly of the magnet 3.

As shown in FIG. 10, for reducing the difficulty of forming the stop hole 31a, the stop hole 31a may be a circular hole. Further for reducing the difficulty of the assembly, a number of the circular holes may be two or more, and the circular holes may be further arranged symmetrically with respect to the axes of the connecting seat 31.

An electronic expansion valve according to the present application is described in detail hereinbefore. The principle and the embodiments of the present application are illustrated herein by specific examples. The above description of examples is only intended to help the understanding of the method and idea of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An electronic expansion valve, comprising a valve seat and a housing; a rotatable magnet being arranged inside the housing, the magnet being fixedly connected to a screw rod, and the screw rod cooperating with a nut by screw threads, and the nut being fixed with respect to the valve seat; the electronic expansion valve further comprising a stop component, the stop component comprising a spindle which is fixed with respect to the valve seat, a spring guide rail sleeved on the spindle, and a sliding ring cooperating with the spring guide rail; wherein, one end of the sliding ring extends to form a stop rod, and the sliding ring and the stop rod are formed integrally, and the magnet is provided with a stop hole, the stop rod passes through the stop hole, and in a case that the sliding ring is at an upper limit position and a lower limit position, the stop rod remains in the stop hole; and wherein, the magnet comprises a connecting seat, the connecting seat is fixedly connected to the screw rod, and the stop hole is provided in the connecting seat.

2. The electronic expansion valve according to claim 1, wherein the stop hole is radially offset with respect to a centerline of the connecting seat.

3. The electronic expansion valve according to claim 1, wherein the spring guide rail is sleeved on an outer circumference of an upper portion of the nut, the upper portion of the nut forms the spindle, and an upper end of the sliding ring extends upwards to form the stop rod.

4. The electronic expansion valve according to claim 1, wherein the spindle is fixed to an inner wall of a top end of the housing, and a lower end of the sliding ring extends downwards to form the stop rod.

5. The electronic expansion valve according to claim 1, wherein the stop hole is an arc segment hole extending in a direction of a circular arc.

6. The electronic expansion valve according to claim 5, wherein two or more of the arc segment hole are provided, and the arc segment holes are arranged symmetrically with respect to an axes.

7. The electronic expansion valve according to claim 1, wherein the stop hole is a circular hole.

8. The electronic expansion valve according to claim 7, wherein two or more of the circular hole are provided, and the circular holes are arranged symmetrically with respect to an axes.

9. The electronic expansion valve according to claim 2, wherein the spring guide rail is sleeved on an outer circumference of an upper portion of the nut, the upper portion of the nut forms the spindle, and an upper end of the sliding ring extends upwards to form the stop rod.

10. The electronic expansion valve according to claim 2, wherein the spindle is fixed to an inner wall of a top end of the housing, and a lower end of the sliding ring extends downwards to form the stop rod.

11. The electronic expansion valve according to claim 2, wherein the stop hole is an arc segment hole extending in a direction of a circular arc.

12. The electronic expansion valve according to claim 11, wherein two or more of the arc segment hole are provided, and the arc segment holes are arranged symmetrically with respect to an axes.

13. The electronic expansion valve according to claim 2, wherein the stop hole is a circular hole.

\* \* \* \* \*